Dec. 30, 1952     M. JAUCH     2,623,282
APPLIANCE FOR CUTTING PAPER, CARDBOARD, CLOTH, LEATHER
AND THE LIKE
Filed June 13, 1950

INVENTOR
MAX JAUCH
By Toulmin & Toulmin
ATTORNEYS

Patented Dec. 30, 1952

2,623,282

UNITED STATES PATENT OFFICE 2,623,282

APPLIANCE FOR CUTTING PAPER, CARDBOARD, CLOTH, LEATHER, AND THE LIKE

Max Jauch, Zurich, Switzerland

Application June 13, 1950, Serial No. 167,713
In Switzerland June 15, 1949

2 Claims. (Cl. 30—154)

The present invention relates to an appliance for cutting paper, cardboard, cloth, leather and the like. A number of cutting appliances for these materials are already known, which however have hitherto not proved to be satisfactory. The purpose of the present invention is to provide a simple and inexpensive appliance, with which any risk of injury when not in use is practically excluded. The novelty of the present invention consists in that a cover plate, standing under the action of a spring, is pivoted on a guide plate, a knife lying between the two plates and being coupled to the cover plate in such a way that, when the cover plate is swung downwards, a part of the knife projecting over the said plate penetrates into the material to be cut and severs it when the guide plate is moved longitudinally.

Figure 1:
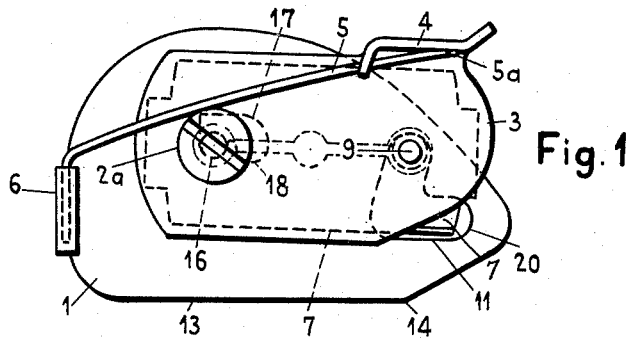
Figure 2:
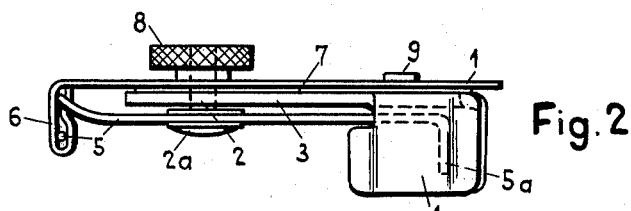
Figure 3:
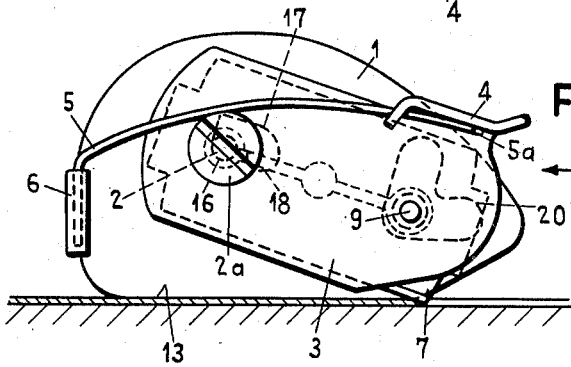
Figure 4:
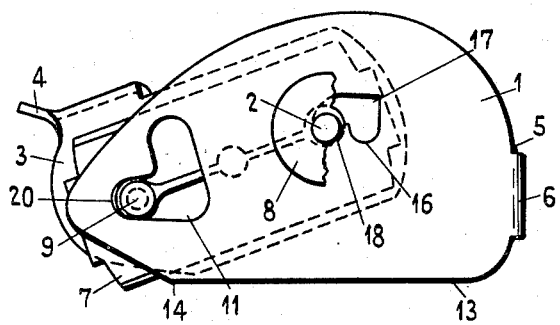

In the accompanying drawing one form of execution of the object of the invention is illustrated by way of example, where Fig. 1 shows a view from behind when not in use, Fig. 2 a plan view, Fig. 3 a view from behind, and Fig. 4 a front view when in use.

The new appliance has a guide plate 1, on which a cover plate 3 is pivoted by means of a screw 2. On the cover plate 3 a handle 4 is arranged, with the free end 5a of a spring 5 pressing against it. This spring 5 is secured in a bearing 6 on the guide plate 1. A knife 7 lies between the two plates 1 and 3, and for it a razor blade known per se can be adapted. The parts 1, 7, 3 lie snugly against each other and can be pressed together by means of a nut 8. The blade 7 is coupled to the cover plate 3 by a pin 9 and is therefore displaced along with the plate. The pin 9 serves at the same time as stop and projects into an angle-shaped slot 11 of the guide plate 1. The slot 11 serves on the one hand for limiting the extent of swivelling of the cover plate 3 with the knife 7, and on the other hand for securing these parts in the working position. The spring 5 tends to keep the two parts 3 and 7 always in their highest position, in which the blade 7 lies covered completely behind the larger guide plate 1. Since the blade 7 lies closely on the plate 1, it is practically impossible, when the appliance is out of use, to receive any injury from the blade.

For use, the plate 1 is held between thumb and middle finger, whilst the index finger swings the cover plate 3 downwards by pressing on the handle 4, the bearing 6 then serving as stop for the middle finger. In this way the blade 7 is pressed into the material 12 to be cut, as is shown in Fig. 3. For cutting in a straight line, the whole lower guiding edge 13 of the plate 1 is laid onto the object to be cut, when of course some kind of support is used for guiding the appliance in a straight line and the appliance is moved in the direction of the arrow A. If it is desired to cut in curves, the plate 1 is held in such a way that only its corner 14, which is at the end of the edge 13, lies on the material to be cut. By loosening the nut 8, the cover plate 3 can be removed and the razor blade thus easily changed for another.

When cutting a material that rests on some underlying support, the screw 2 lies in the notch 16 of an aperture 17 made in the plate 1 (Figs. 1–3). But if the screw 2 is brought into the notch 18 and the pin 9 into the part 20 of the slot 11, the knife 7 with the cover plate 3 will be held firmly in this position (Fig. 4). With the knife 7 projecting beyond the plate in this manner, freely hanging cloth, papers, etc. can easily be cut. The spring 5, always resting on the knob 2a of the screw 2, then presses the latter into the notch 18, so that the screw 2 cannot become unintentionally displaced in the aperture 17.

A further advantage of the new appliance as compared with known appliances serving the same purpose, is that it is practically no longer possible to damage the rulers, T squares, set squares and such like, used as guiding means when cutting.

What I claim is:

1. A device for cutting paper or the like comprising: a guide plate, a cover plate adjacent said guide plate, a cutting blade removably mounted on the cover plate on the side thereof adjacent said guide plate, a pivot pin extending through said plates adjacent one end of the cover plate and having a head thereon on the side of the cover plate opposite the guide plate, one corner of said cover plate at its end opposite the pivot pin being bent outwardly to form a finger piece, a spring having one end anchored on said guide plate and its other end bearing on the underneath side of said finger piece, said spring extending across the outer surface of the cover plate, and engaging one side of the head of said pivot pin, a U-shaped slot in said guide plate receiving said pivot pin and having its legs extending toward the side of the head of the pivot pin opposite the side engaged by said spring whereby the spring will retain the pivot pin in either of said legs, said cover plate being free to pivot about the axis of said pin when the pin is in one of the legs of said slot, and there being means to lock the cover plate in position on said guide plate when the said pin is in the other leg of said slot.

2. A device for cutting paper or the like, comprising: a guide plate having a straight lower edge portion, a cover plate slightly smaller than the guide plate adjacent thereto, a cutting blade slightly smaller than the cover plate removably mounted on the guide plate side thereof, a pivot pin extending through said plates adjacent one end thereof and having a head thereon on the side of the cover plate opposite the guide plate, the upper corner of said cover plate at its end opposite the pivot pin being formed outwardly to form a finger piece and the lower corner of the cover plate at the same end being formed to expose the adjacent corner of the cutting blade, a spring having one end anchored on one end of the said guide plate and its other end bearing on the underneath side of said finger piece, said spring also engaging the top of the head of said pivot pin, and inverted U-shaped slot in said guide plate receiving the pivot pin whereby the spring will resiliently retain the pin in either of the legs of said slot, said cover plate being free to pivot about the axis of said pin when the pin is in one of the legs of the slot to permit movement of the exposed corner of the cutting blade into a position where it projects beyond the straight lower edge portion of the guide plate, and means comprising interengageable elements on said cover plate and guide plate engageable when the pivot pin is in the other leg of said slot and operable to lock the cover plate to said guide plate with the said exposed corner of the cutting blade projecting below the said lower straight edge portion of said guide plate.

MAX JAUCH.

REFERENCES CITED

The following references are of record in the file of this patent:

UNITED STATES PATENTS

| Number | Name | Date |
|---|---|---|
| 1,860,454 | Dessell | May 31, 1932 |
| 2,209,751 | Wulff | July 30, 1940 |